United States Patent
Losinger

(10) Patent No.: US 6,397,474 B1
(45) Date of Patent: Jun. 4, 2002

(54) CABLE PREPARATION TOOL

(76) Inventor: Roger M. Losinger, R.R. 1 Box 149 A1, Liberty, PA (US) 16930

( * ) Notice: Subject to any disclaimer, the term of this patent is extended or adjusted under 35 U.S.C. 154(b) by 0 days.

(21) Appl. No.: 09/370,627

(22) Filed: Aug. 6, 1999

Related U.S. Application Data

(60) Provisional application No. 60/096,076, filed on Aug. 11, 1998.

(51) Int. Cl.$^7$ ................................................. B21F 13/00
(52) U.S. Cl. .............................. 30/90.2; 30/90.1; 81/9.4
(58) Field of Search ................................. 30/90.2, 90.1, 30/122; 81/9.4, 9.51, 9.41, 9.42, 9.44

(56) References Cited

U.S. PATENT DOCUMENTS

| | | | | |
|---|---|---|---|---|
| 3,486,216 A | | 12/1969 | Cimolino | |
| 3,851,387 A | * | 12/1974 | Ducret | 30/90.3 |
| 4,027,557 A | * | 6/1977 | Stepan | 30/90.1 |
| 4,317,279 A | * | 3/1982 | Smith et al. | 30/90.1 |
| 4,594,029 A | * | 6/1986 | Michael, III | 30/90.1 |
| 4,729,268 A | | 3/1988 | Morrow | |
| 5,023,995 A | * | 6/1991 | Kaplan | 30/90.1 |
| 5,105,542 A | | 4/1992 | Nakajima et al. | |
| 5,511,305 A | * | 4/1996 | Garner | 30/90.4 |
| 5,669,276 A | * | 9/1997 | Spacek | 30/90.1 |
| 5,673,486 A | * | 10/1997 | Brown | 30/90.1 |
| 5,829,141 A | * | 11/1998 | Pick | 30/90.7 |
| 6,018,873 A | * | 2/2000 | McClellan | 30/90.4 |
| 6,131,289 A | * | 10/2000 | Tarpill | 30/90.6 |
| 6,161,289 A | * | 12/2000 | Alexander | 30/90.1 |

\* cited by examiner

*Primary Examiner*—M. Rachuba
*Assistant Examiner*—Kim Ngoc Tran
(74) *Attorney, Agent, or Firm*—John J. Elnitski, Jr.

(57) ABSTRACT

The present invention is a cable preparation tool which allows the preparation of a coaxial cable having a corrugated outer conductor to receive a connector in one step. The tool allows for the control of trim dimensions for each component of the cable without measuring. No matter whether the end of the cable before preparation is at the crest or valley of the outer conductor, the tool provides the correct trim dimensions for each component and stops cutting when these dimensions are reached. The cable preparation tool includes a main body having a cable receiving end, cable receiving area for stripping of the cable such that the crests and valleys are exposed, and a crest and valley locating system as part of the main body for locating the exposed crests and valleys of the corrugated conductor. The crest and valley locating system includes at least one valley locator unit extending into the cable receiving area and a spring that biases the valley locator unit into the cable receiving area. The valley locator unit moves away from a crest of the cable as the crest contacts the valley locator unit and rebounds into the next valley due to the biasing of the spring during insertion of the cable.

16 Claims, 19 Drawing Sheets

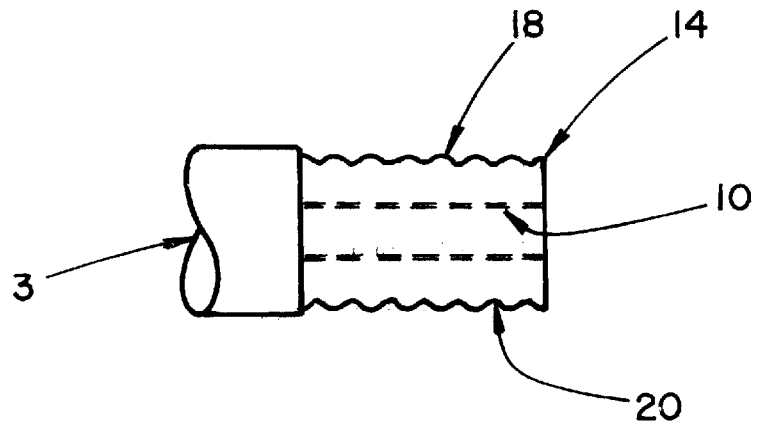
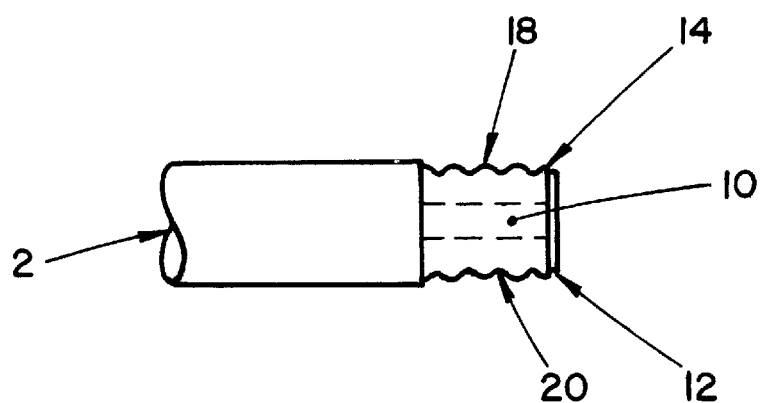
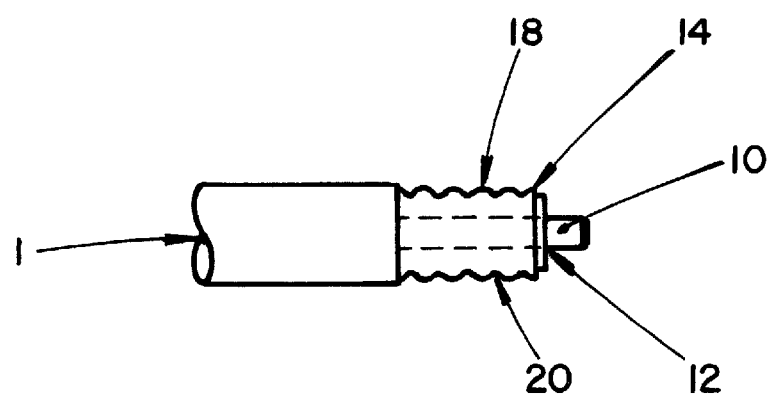
FIG. 3

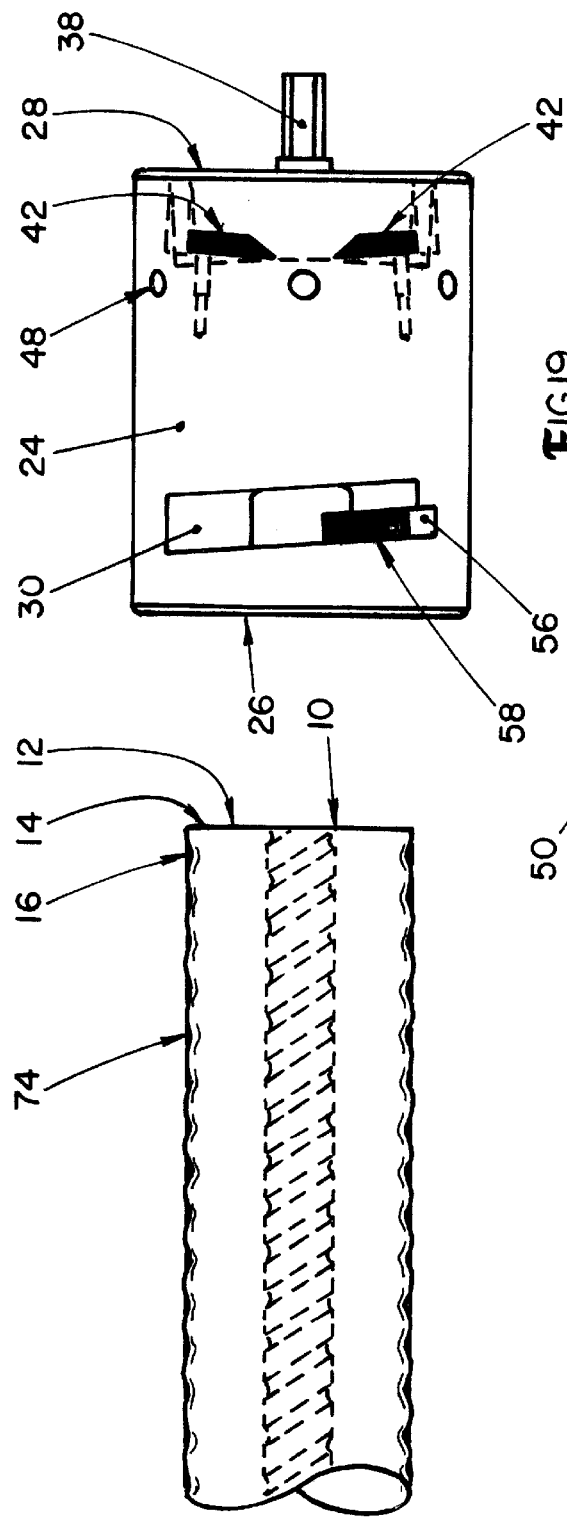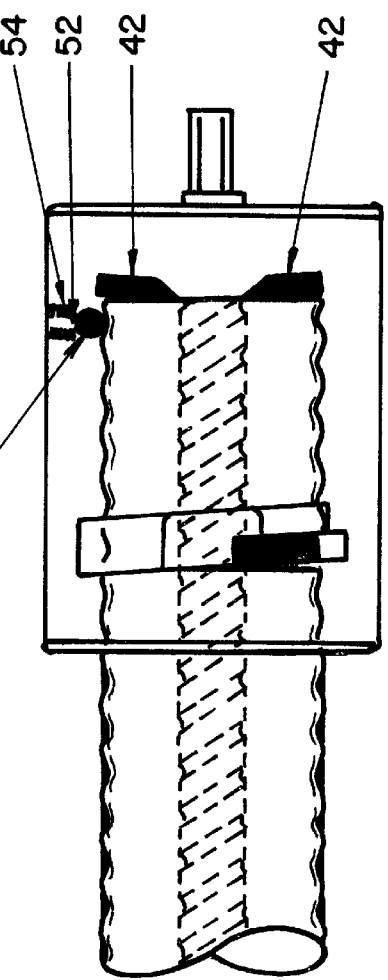

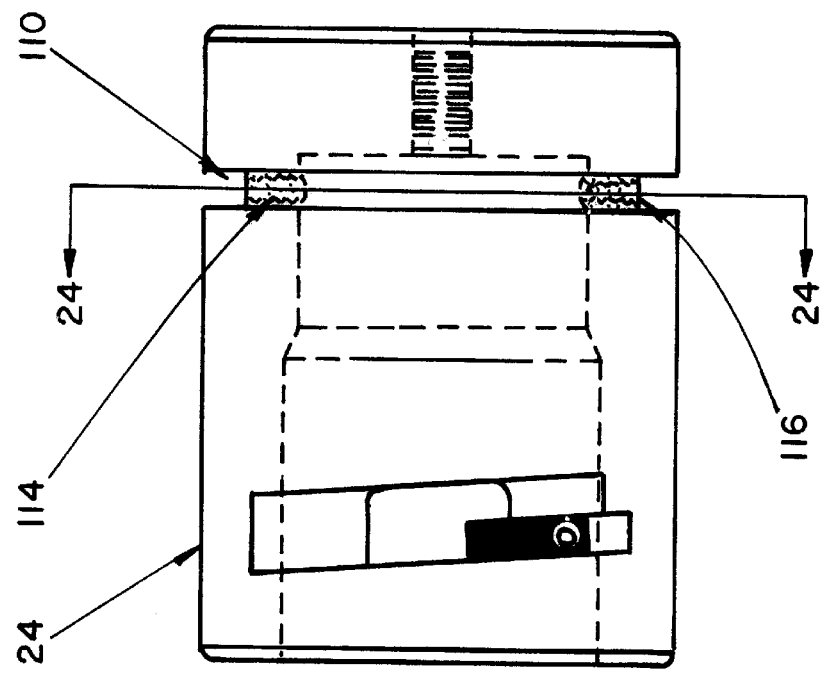
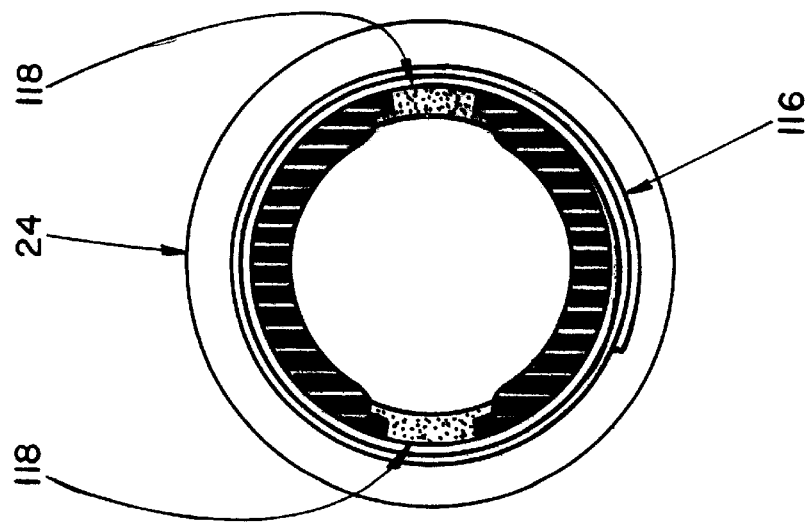
FIG.23
FIG.24

CABLE PREPARATION TOOL

This application claims priority to U.S. Provisional Application No. 60/096,076 filed Aug. 11, 1998, which is herein incorporated by reference.

BACKGROUND

The present invention relates to the preparation of a coaxial cable for the fitting of a connector, especially coaxial cable having a corrugated outer conductor. Examples of coaxial cables using a corrugated outer conductor are shown in FIGS. 1-3. The components of the corrugated outer conductor coaxial cable are a center conductor 10, dielectric 12, outer conductor 14 and an outer jacket 16. FIGS. 1 and 2 shows the center conductor 10 as a solid conductor for cable 1 and as a hollow conductor for cables 2, 3. The outer conductor 14 is of a corrugated material. When a cable having a corrugated outer conductor is prepared to receive a connector, a hack saw is usually used to cut the cable to the approximate termination length. More precise preparation of the various cable components is then performed per the connector manufacturer's specifications. Manufacturer's specifications usually call for unique trim dimensions of the outer jacket, outer conductor, dielectric and center conductor. The trim dimension of each cable component depend on the connector to be used. The trim dimension of any given cable component is often given in reference to another cable component. More specifically, for example, the trim dimension of the outer jacket may refer not only to a specific number (x) of bare corrugations of the outer conductor 14 required, but whether the reference point is at the crest 18 or valley 20 of a specific corrugation. Generally, for most connectors, the trimming of the outer conductor is required at a crest of the corrugated material. Providing the proper trim dimension for each cable component requires the use of off-the-shelf hand tools (including but not limited to a tape measure, scribe, knives, diagonal cutters, pliers, hack saw, wire or nylon brush) used individually to separately prepare the different cable components. It is desired by a technician to have one tool to perform the trimming of all the cable components in one step when preparing a cable end for a connector.

It is an object of the present invention to provide a cable preparation tool which removes the proper amount of all the components of a coaxial cable to receive a cable connector in one step without the use of other tools.

SUMMARY OF THE INVENTION

The present invention is a cable preparation tool for stripping a coaxial cable having a corrugated conductor that includes crests and valleys. The cable preparation tool includes a main body having a cable receiving end, cable receiving area for stripping of the cable such that the crests and valleys are exposed, and a crest and valley locating system as part of the main body for locating the exposed crests and valleys of the corrugated conductor. The crest and valley locating system includes at least one valley locator unit extending into the cable receiving area and a spring that biases the valley locator unit into the cable receiving area. The valley locator unit moves away from a crest of the cable as the crest contacts the valley locator unit and rebounds into the next valley due to the biasing of the spring during insertion of the cable.

BRIEF DESCRIPTION OF THE DRAWINGS

FIG. 3 is a side view of three cables having a corrugated conductor according to the present invention;

FIG. 19 is a side view showing insertion of a cable into the first embodiment of a cable preparation tool according to the present invention;

FIG. 20 is a side view showing an inserted cable in the first embodiment of a cable preparation tool according to the present invention;

FIG. 23 is a side view of a fifth embodiment of the cable preparation tool according to the present invention;

FIG. 24 is a cut through view of the cable preparation tool of FIG. 23 according to the present invention;

DESCRIPTION OF THE INVENTION

Figure 1:
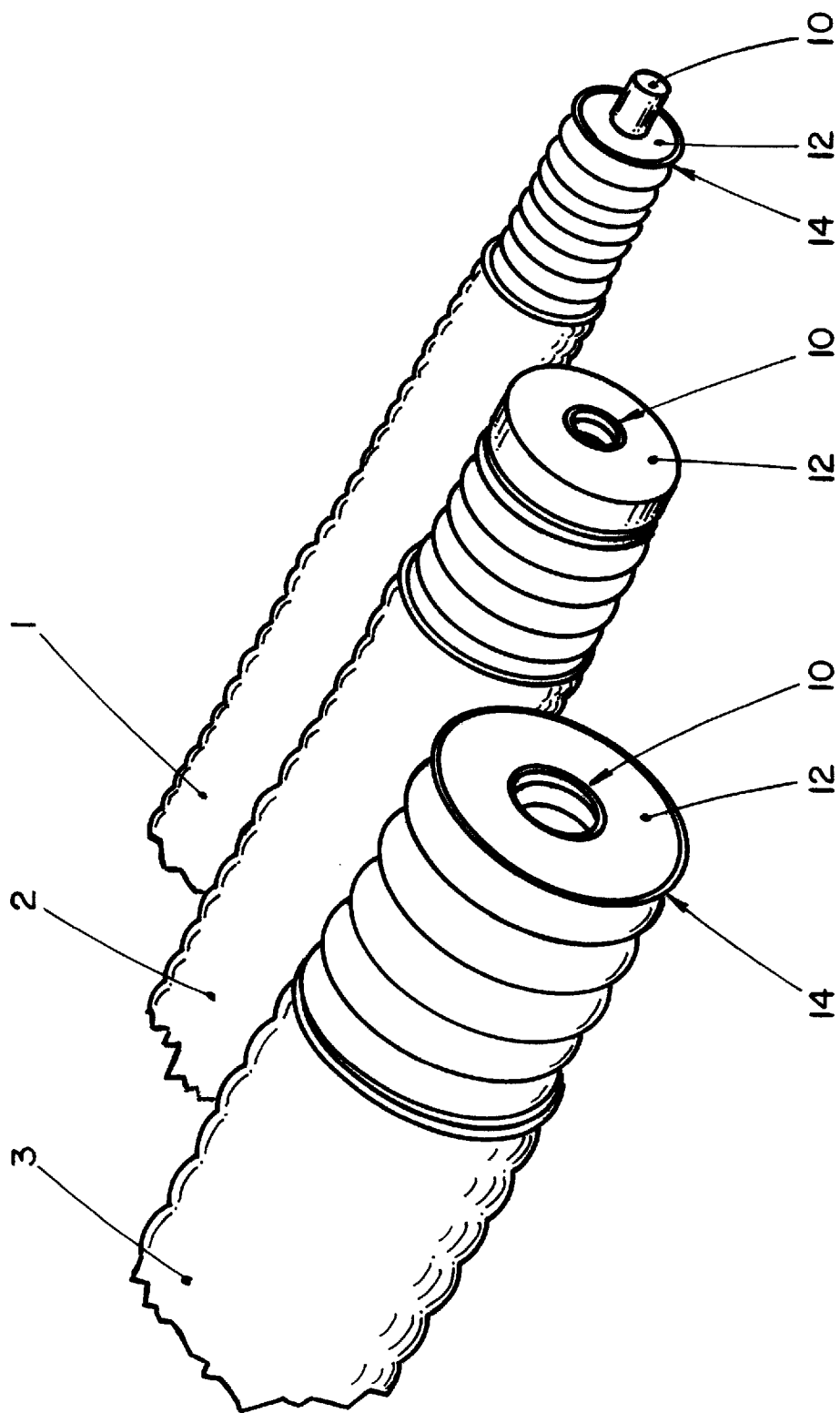
FIG. 1 is a perspective view of three cables having a corrugated conductor according to the present invention.

The present invention is a cable preparation tool which allows the preparation of a coaxial cable having a corrugated outer conductor to receive a connector in one step. The embodiments of the tool are shown in FIGS. 4–28. The tool 22 allows for the control of trim dimensions for each component of the cable without measuring. No matter whether the end of the cable before preparation is at the crest 18 or valley 20 of the outer conductor 14, the tool 22 provides the correct trim dimensions for each component and stops cutting when these dimensions are reached. The features of the tool 22 which control the preparation of the cable are the proper positioning of cutting blades along with a crest and valley locating system.

The tool 22 includes a main body 24, a series of cutting blades and a locating ball system. As shown in FIGS. 4–10, the main body 24 of the tool 22 is shown as a cylinder and preferably made from a light weight material such as aluminum. If a material such as aluminum is used, the inside of the main body 24 should be anodized with a hard coating where the tool 22 contacts the cable, so that the two do not gauld. The main body 24 has a cable receiving end 26, an attachment end 28 and at least one jacket removal slot 30 in the outside diameter 32 of the main body 24. The cable receiving end 26 is bored out to a diameter of a size large enough to receive a jacketed corrugated cable. The boring out of the main body 24 creates a cable receiving area 34 for the cable that is defined by the inside diameter 36 of the receiving end 26.

Figure 2:
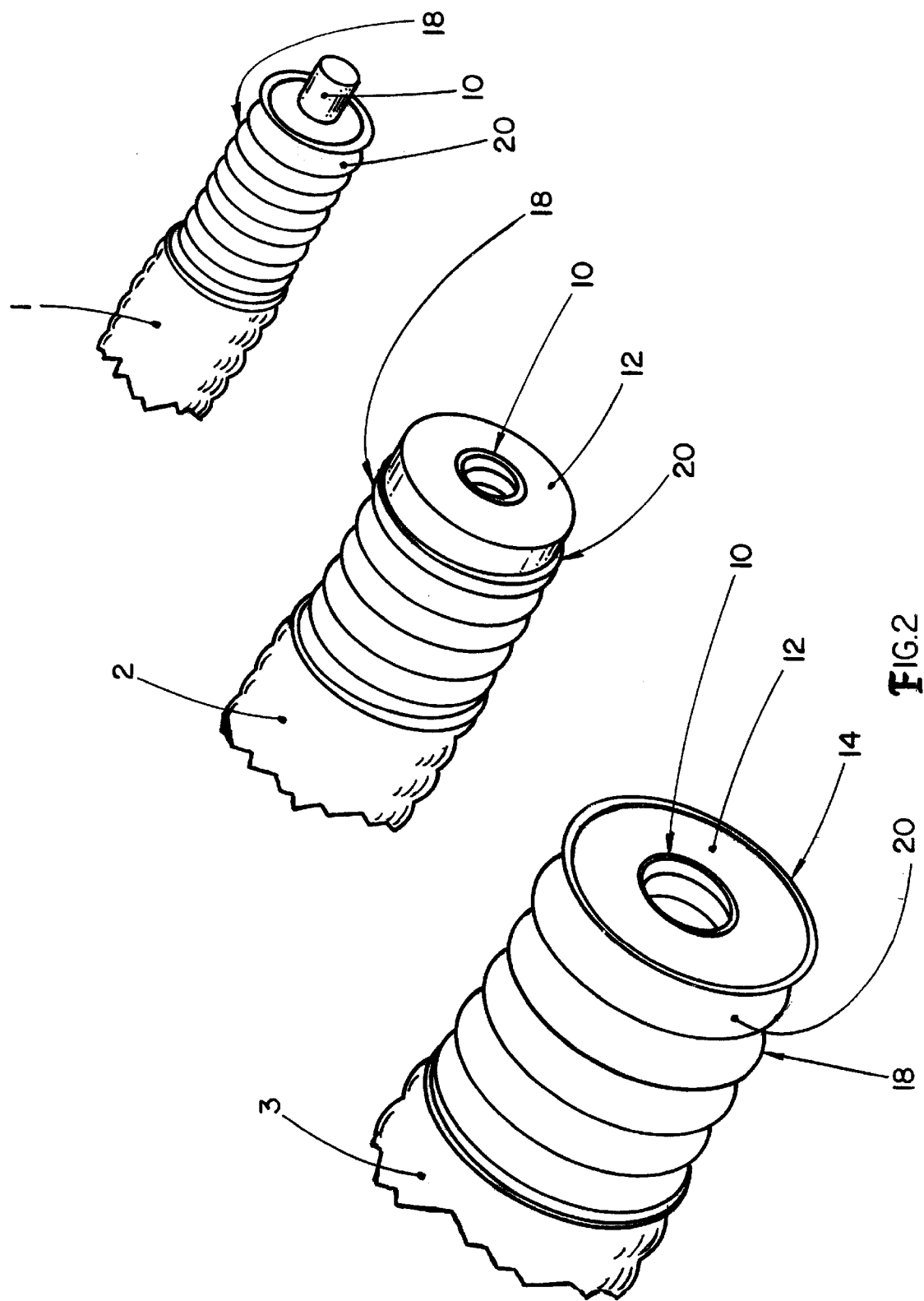
FIG. 2 is another perspective view of three cables having a corrugated conductor according to the present invention.
Figure 4:
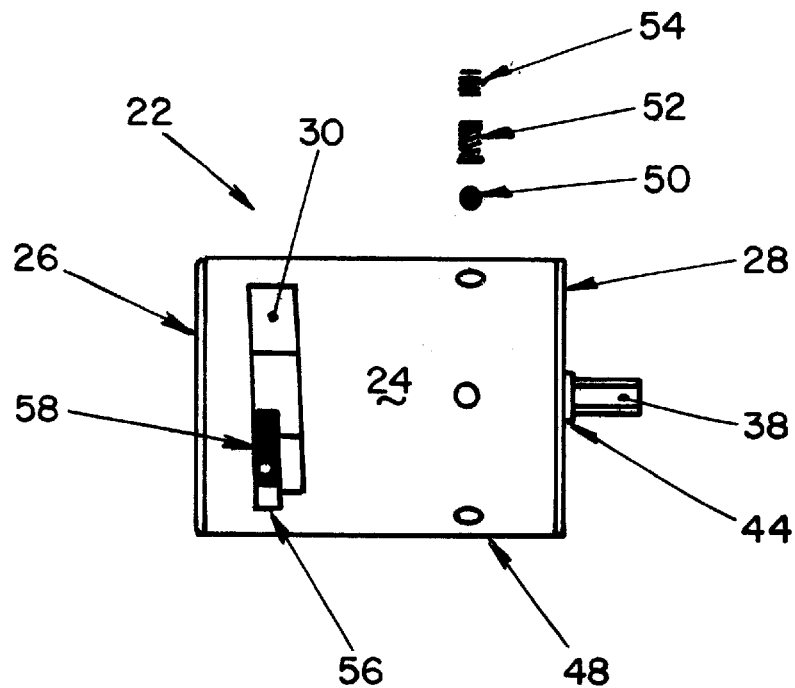
FIG. 4 is a side view of a first embodiment of a cable preparation tool according to the present invention.
Figure 5:
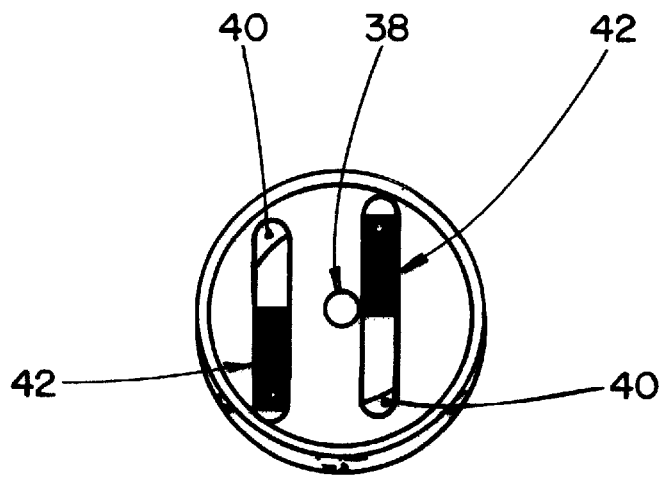
FIG. 5 is an attachment end view of the cable preparation tool of FIG. 4 according to the present invention.
Figure 6:
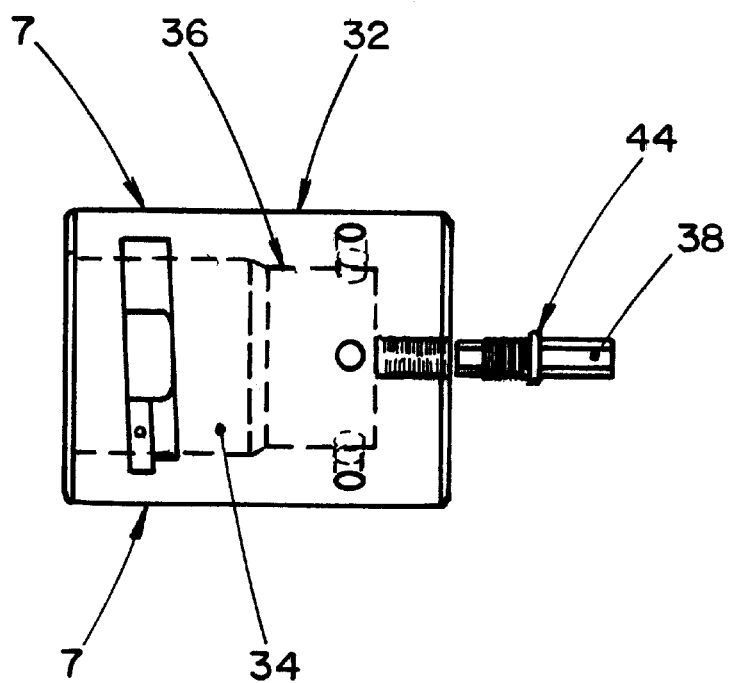
FIG. 6 is an exploded side view of the cable preparation tool of FIG. 4 according to the present invention.
Figure 7:
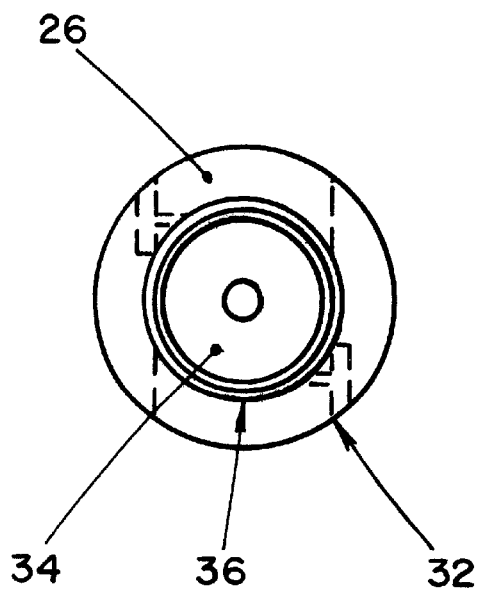
FIG. 7 is an cable receiving end view of the cable preparation tool of FIG. 6 according to the present invention.
Figure 10:
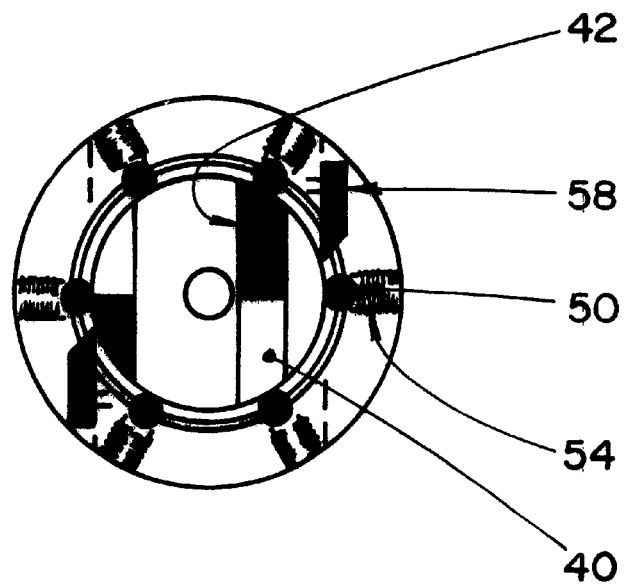
FIG. 10 is a cut through view of the cable preparation tool of FIG. 8 according to the present invention.
Figure 11:
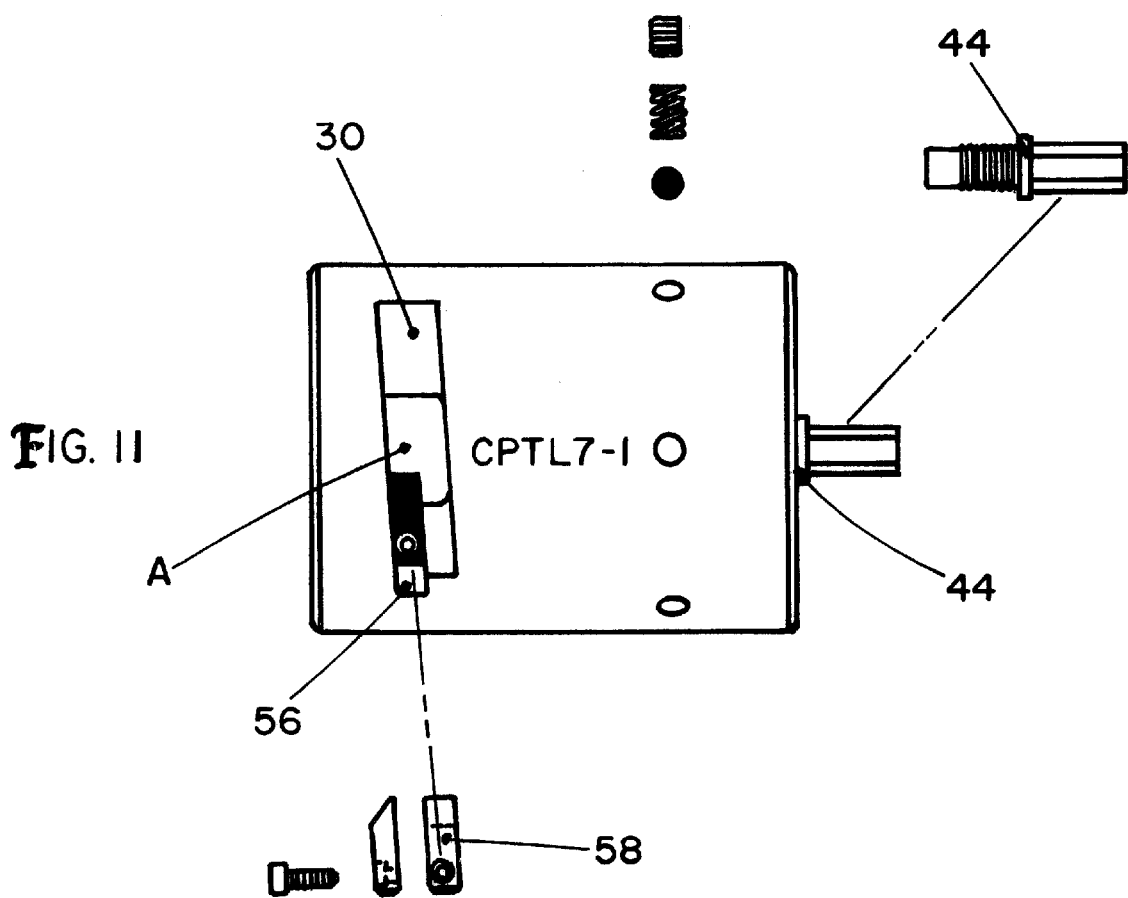
FIG. 11 is a side view of a first embodiment of a cable preparation tool according to the present invention.
Figure 12:
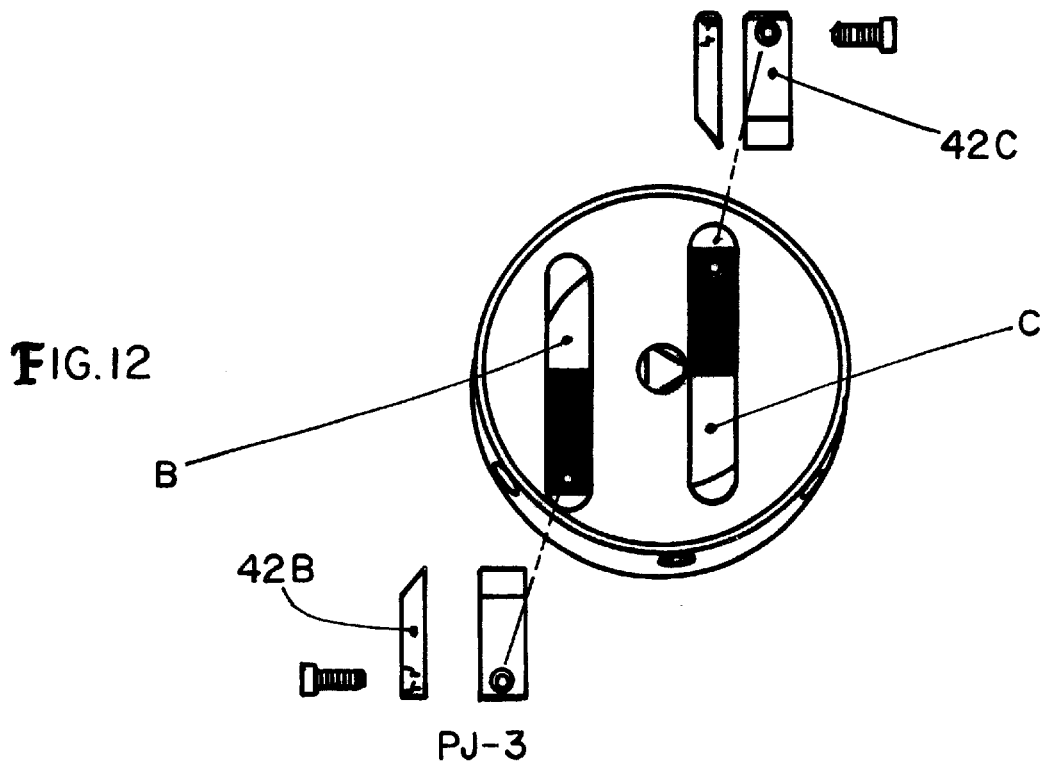
FIG. 12 is an attachment end view of the cable preparation tool of FIG. 11 according to the present invention.
Figure 13:
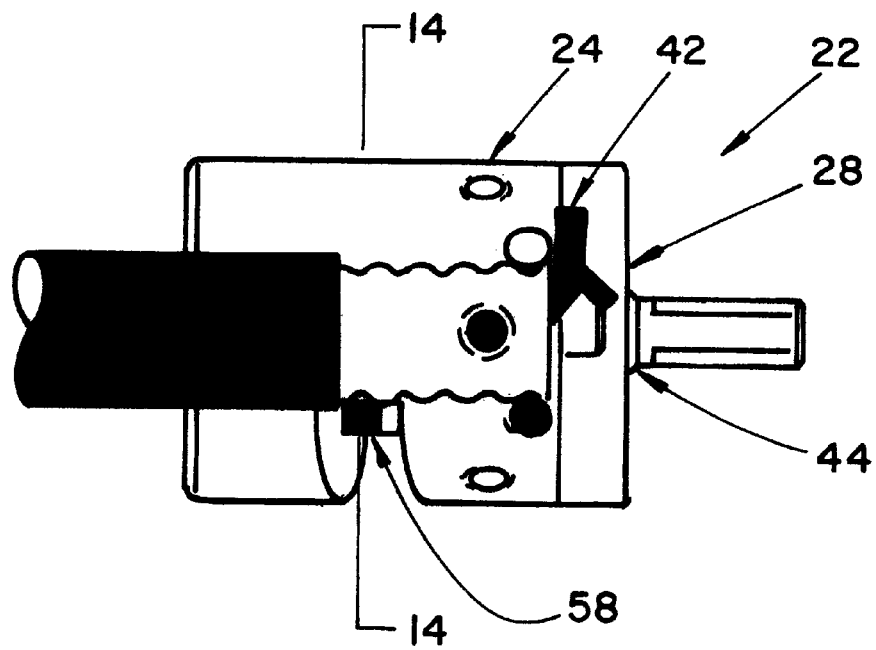
FIG. 13 is a side view of a second embodiment of a cable preparation tool according to the present invention.
Figure 14:
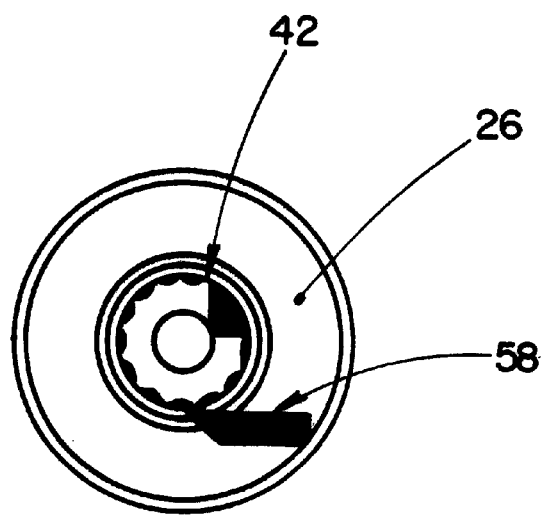
FIG. 14 is a cut through view of the cable preparation tool of FIG. 13 according to the present invention.
Figure 15:
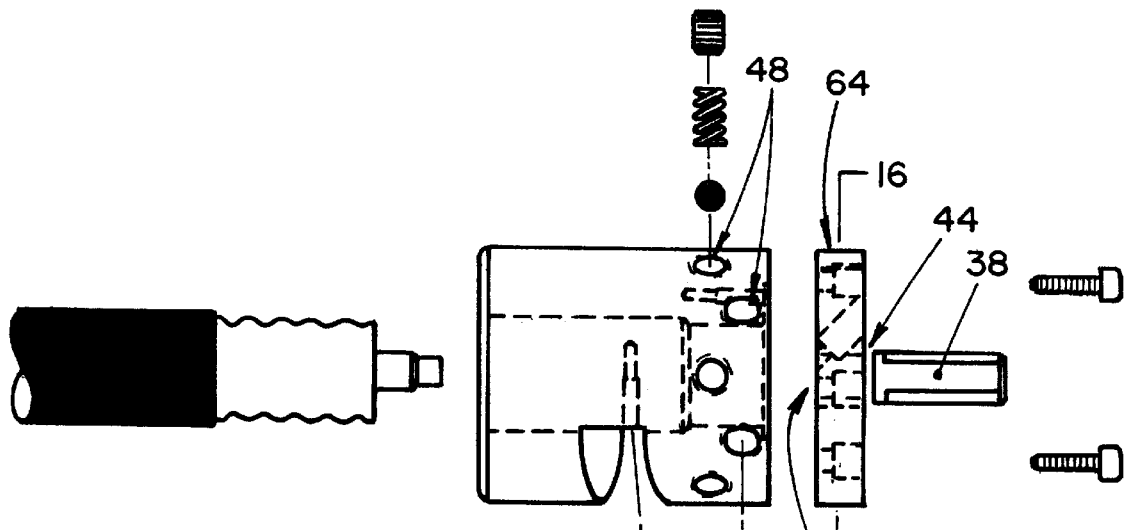
FIG. 15 is an exploded side view of the cable preparation tool of FIG. 13 according to the present invention.
Figure 16:
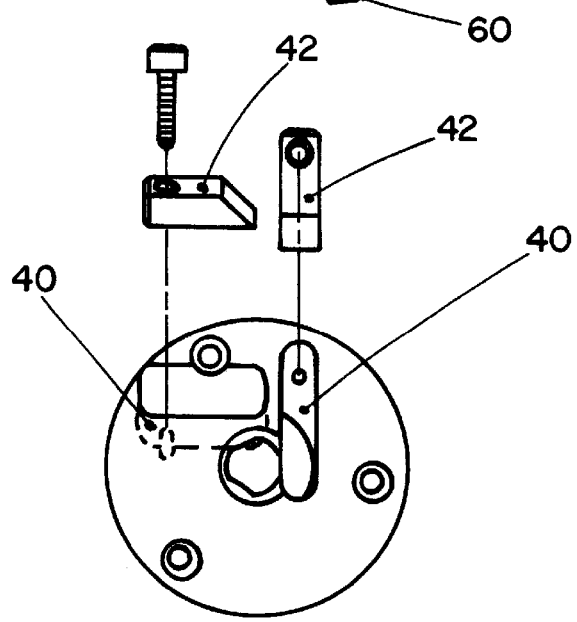
FIG. 16 is an exploded and cut through attachment end view of the cable preparation tool of FIG. 15 according to the present invention.
Figure 17:
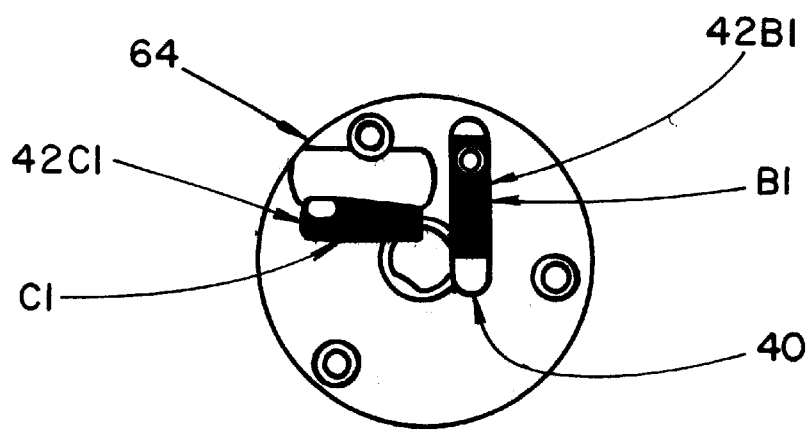
FIG. 17 is a cut through attachment end view of the cable preparation tool of FIG. 15 according to the present invention.

The attachment end 28 of the main body 24 is a closed end with a shank 38 extending from it and at least one trim end slot 40. All of the tools shown in FIGS. 4–20 include at least two trim end slots 40. Each trim end slot 40 includes a end cutting blade 42 mounted in the slot 40 for trimming the end of the cable. Placement and depth of the trim end slots 40 and end cutting blades 42 in the attachment end 28 depends on the desired trim dimensions as will be explained further. The shank 38 is either a separate piece which screws into the attachment end 28 or is integral to the attachment end 28. The shank 38 is compatible with a handle for manual usage or drill chuck for power assisted operation. The shank 38 features a shoulder 44 that prevents the attachment end 28 from coming in contact with a handle or drill chuck. Maintaining this clearance allows for cable debris to exit from the trim end slots 40 without jamming the motion of the tool 22. As shown in FIGS. 11–12, a first end cutting blade 42B shown in location 'B' is responsible for facing off the dielectric material adjacent to the outer conductor 14. The blade 42B is heat treated to increase blade life and maintain sharpness. This blade 42B also cuts the outer conductor 14 of the cable to length. The blade design and position prevents signal conductive debris from the outer conductor 14 from embedding in the dielectric 12 during the cutting process, as happens when using a hacksaw. A second end cutting blade 42C shown in location 'C' receives the same blade design as location 'B'. This blade 42C is responsible for facing off the foam dielectric 12 adjacent to the center conductor 14 and on the same plane as the dielectric 12 faced off by the blade 42B in location 'B'. These blades 42B, 42C 'overlap' the dielectric area they are facing off. The blade 42C in 'C' also cuts the center conductor 10 of the cable to length. The end cutting blades 42 shown in locations 'B' and 'C' produce the cable end as shown or cable 3 in FIGS. 1 and 2.

The crest and valley locating system include a valley locator unit and something to bias the valley locator unit into the cable receiving area 34. FIGS. 4–20 show a version of the crest and valley locating system having a ball 50 as the valley locator unit and a spring 52 to bias the ball 50 into the cable receiving area 34. The crest and valley locating system shown in FIGS. 4–20 also includes a series of ball holes 48. Each ball hole 48 includes the ball 50, spring 52 and a set screw 54. The ball holes 48 are part of the main body 24 and are located around the outside diameter 32 of the main body 24. There are two embodiments of ball holes 48. The first embodiment as shown in FIGS. 4–12 has one row of ball holes 48 circling the diameter of the tool 22. The second embodiment as shown in FIGS. 13–17 has two rows of ball holes 48, for use with smaller cables. The smaller cables seem to need a second set of balls 50 riding in an adjacent valley 20 to the first set of balls 50 and valley 20, in order to ensure an accurate trim of the cable components. Factors contributing to the need for a second set of balls 50 are that initial cutting of the cable may be at a crest instead of normal initial valley cut and the outer conductor 14 tends to be damaged when only using one set of balls 50 on the smaller cables. Each ball hole 48 is first drilled of a diameter that will only allow a portion of a surface of the ball 50 to extend outward into the receiving area 34 from the inside diameter 36 of the main body 24. Then, each ball hole 48 is drilled almost to the inside diameter 36 of the main body 24 of a diameter to allow the ball 50 to be placed inside of the ball hole 48 yet be retained in the hole 48. The drilling of the larger hole in effect creates a race for the ball 50 to ride in at the bottom of the hole 48 near the inside diameter 36 of the main body 24. The spring 52 is placed in the ball hole 48 after insertion of the ball 50. The ball hole 48 is tapped to receive the set screw 54 which secures the ball 50 and spring 52 in the ball hole 48.

Figure 8:
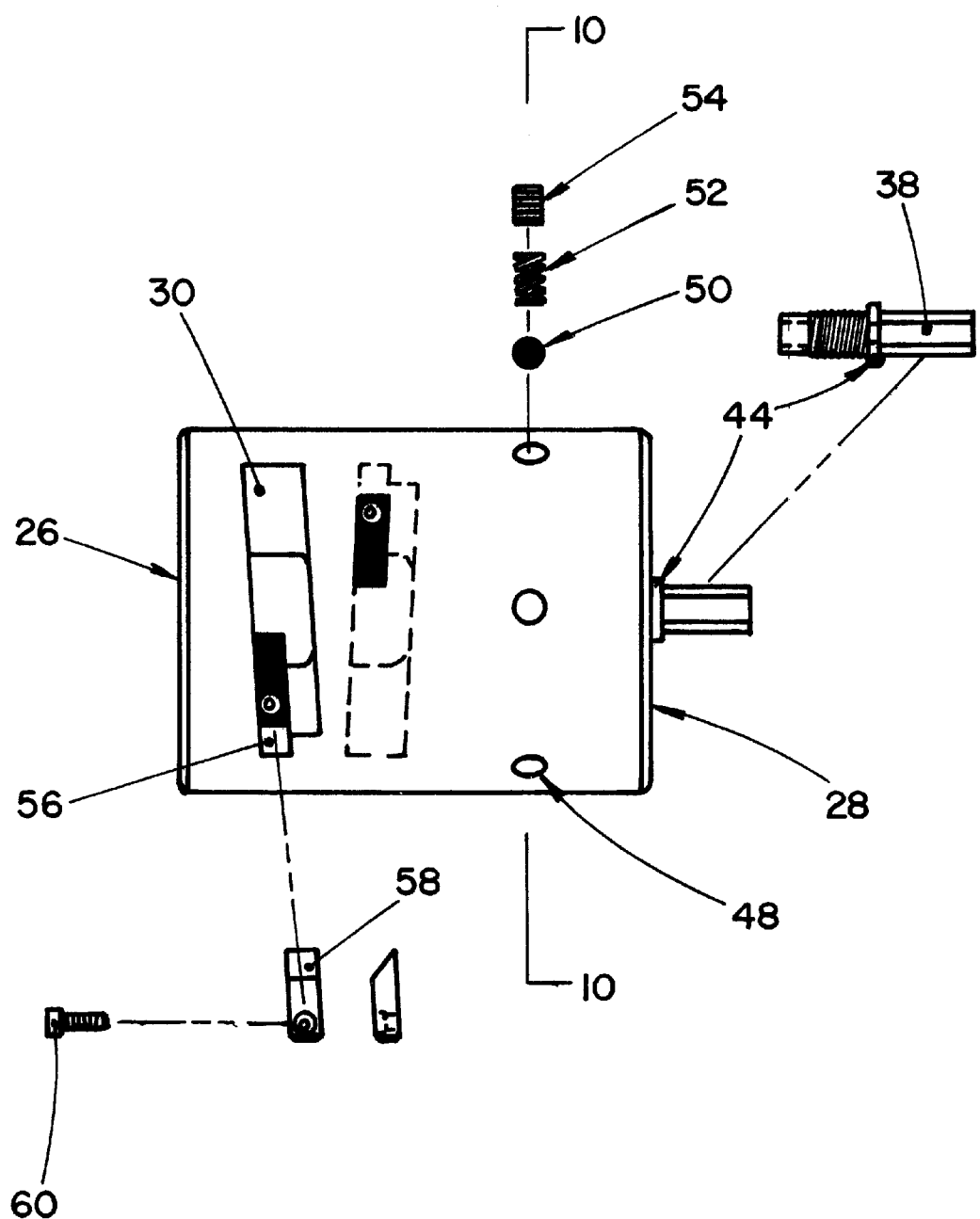
FIG. 8 is an exploded side view of the cable preparation tool of FIG. 4 according to the present invention with an additional blade in the side.
Figure 9:
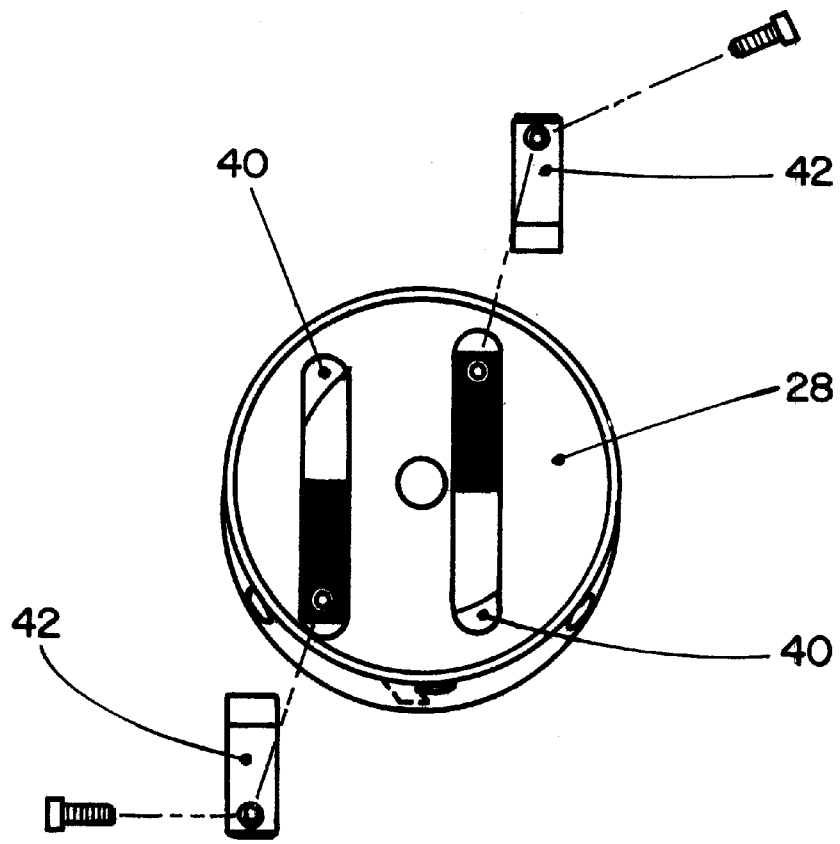
FIG. 9 is an attachment end view of the cable preparation tool of FIG. 8 according to the present invention.

As shown in FIGS. 4–17 and 19–20, the jacket removal slot 30 runs transverse to the diameter of the cable to be prepared. There is a pocket 56 machined in the jacket removal slot 30 for holding a jacket cutting blade 58. The jacket cutting blade 58 is drilled and counter bored to secure it in place with a cap screw 60 using a tapped hole in the pocket 56. As shown in FIGS. 8 and 10, there can be more than one jacket removal slot 30 positioned along the length of the tool 22. Each jacket removal slot 30 is for a different trim length of cable's jacket 16. Simply mount the jacket cutting blade 56 in the proper jacket removal slot 30 to obtain the proper jacket trim dimension. A jacket cutting blade 58 is shown in location 'A' of FIG. 11 for removing the outer rubberized/plastic jacket 16 of the cable. The blade 58 is heat treated to increase blade life and maintain sharpness. The design of this blade 58 features a cutting edge that lifts the jacket 16 away from the outer conductor 14 of the cable so as to prevent the blade 58 from contacting/damaging the outer conductor 14. Both the angle of the blade 58 and the angle of the blade pocket 56 in which blade 58 is situated are designed so the blade 58 engages and cuts/lifts away the jacket 16 when the tool 22 is turned in a clockwise direction.

The depth of the pocket 56 is critical in that it has to place the cutting edge of the blade 58 close enough to the outside diameter of the outer conductor 14 so as to effectively lift and cut the jacket 16, but at the same time be far enough away so as not to contact or damage the outer conductor 14. The jacket removal slot 30 is designed to provide an exit path for the jacket 16 being removed as well as to provide a view of the removal process.

Figure 18A:
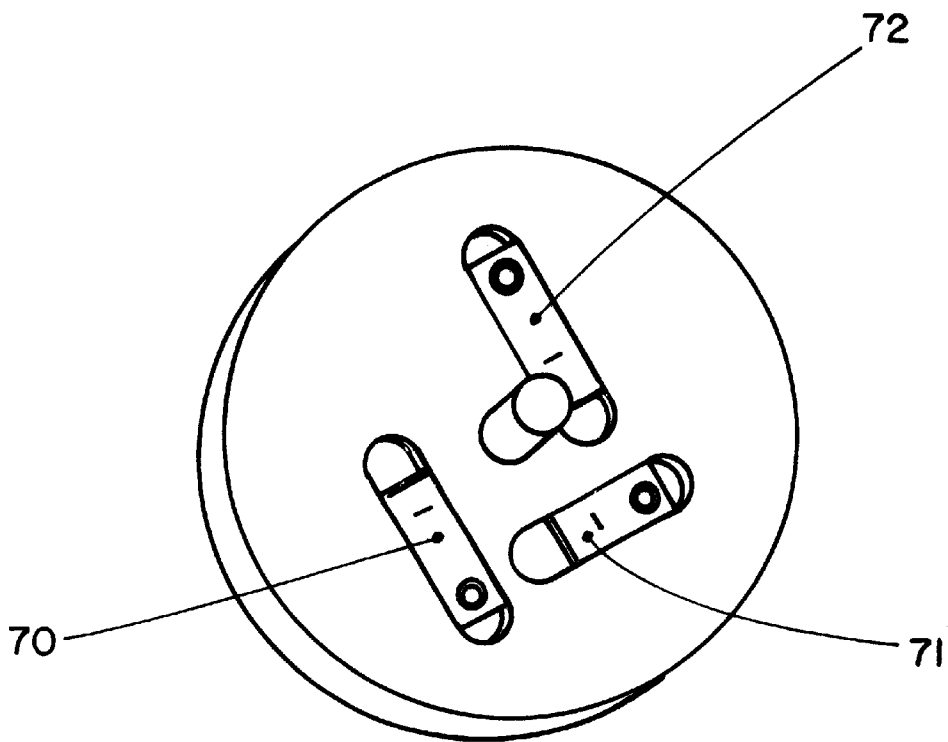
FIG. 18a is an attachment end view of a third embodiment of the cable preparation tool according to the present invention.
Figure 18B:
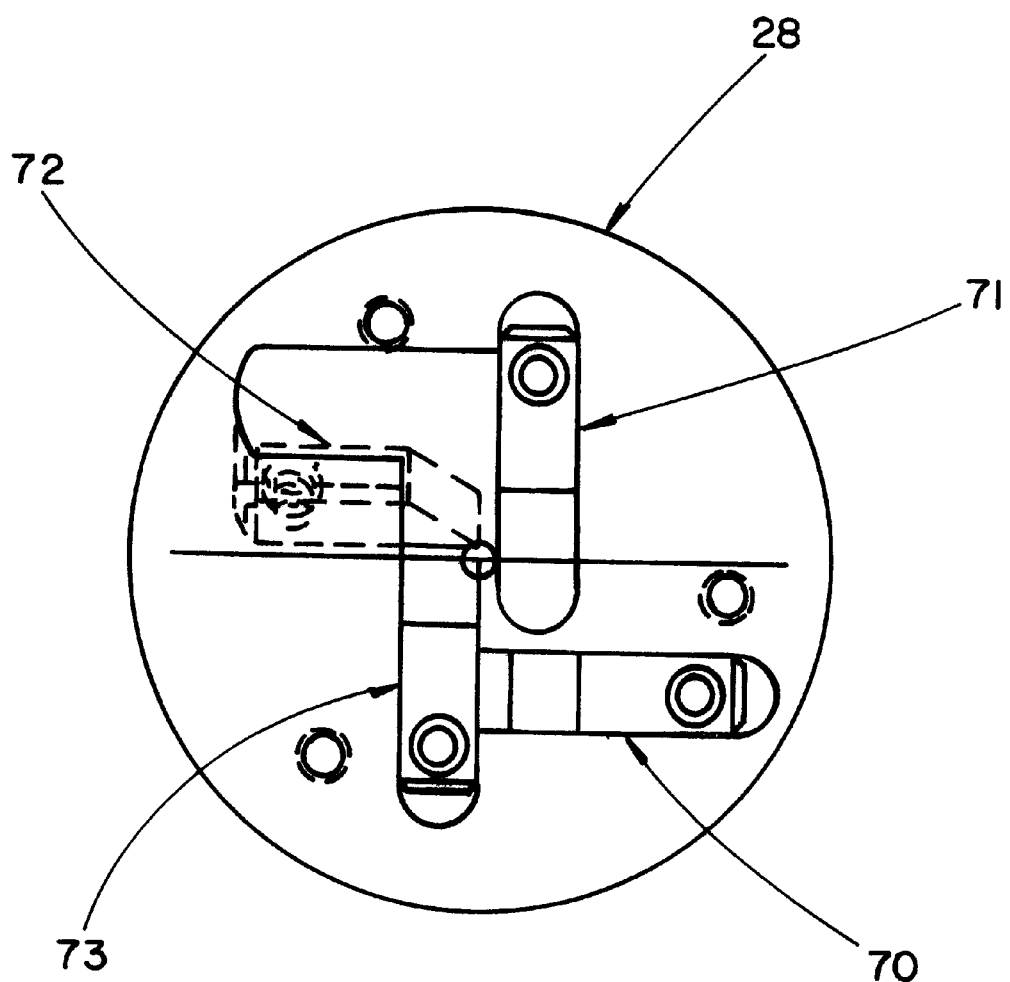
FIG. 18b is an attachment end view of the main body of a fourth embodiment of the cable preparation tool according to the present invention.
Figure 18C:
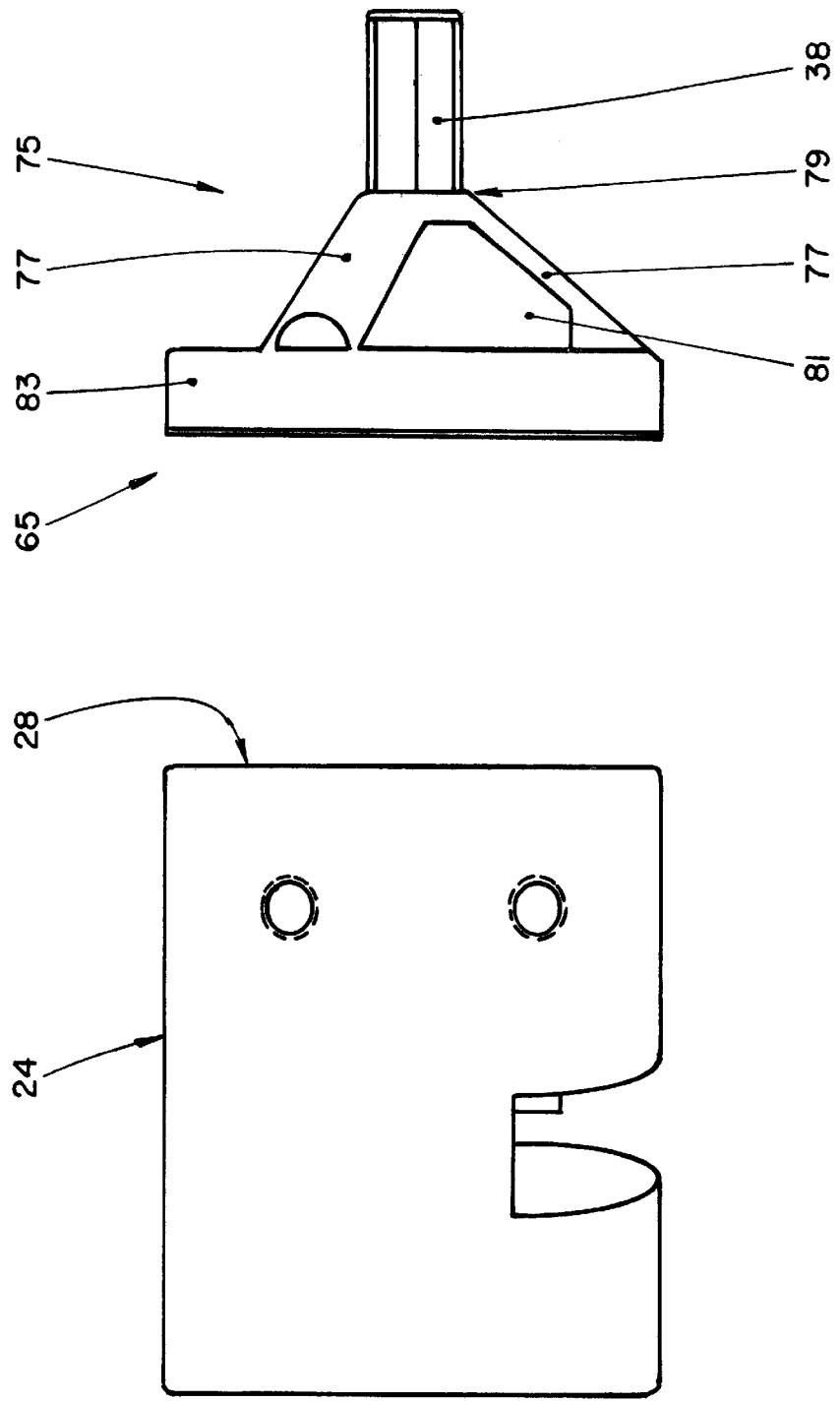
FIG. 18c is a side view of the cable preparation tool of FIG. 18b according to the present invention.
Figure 18D:
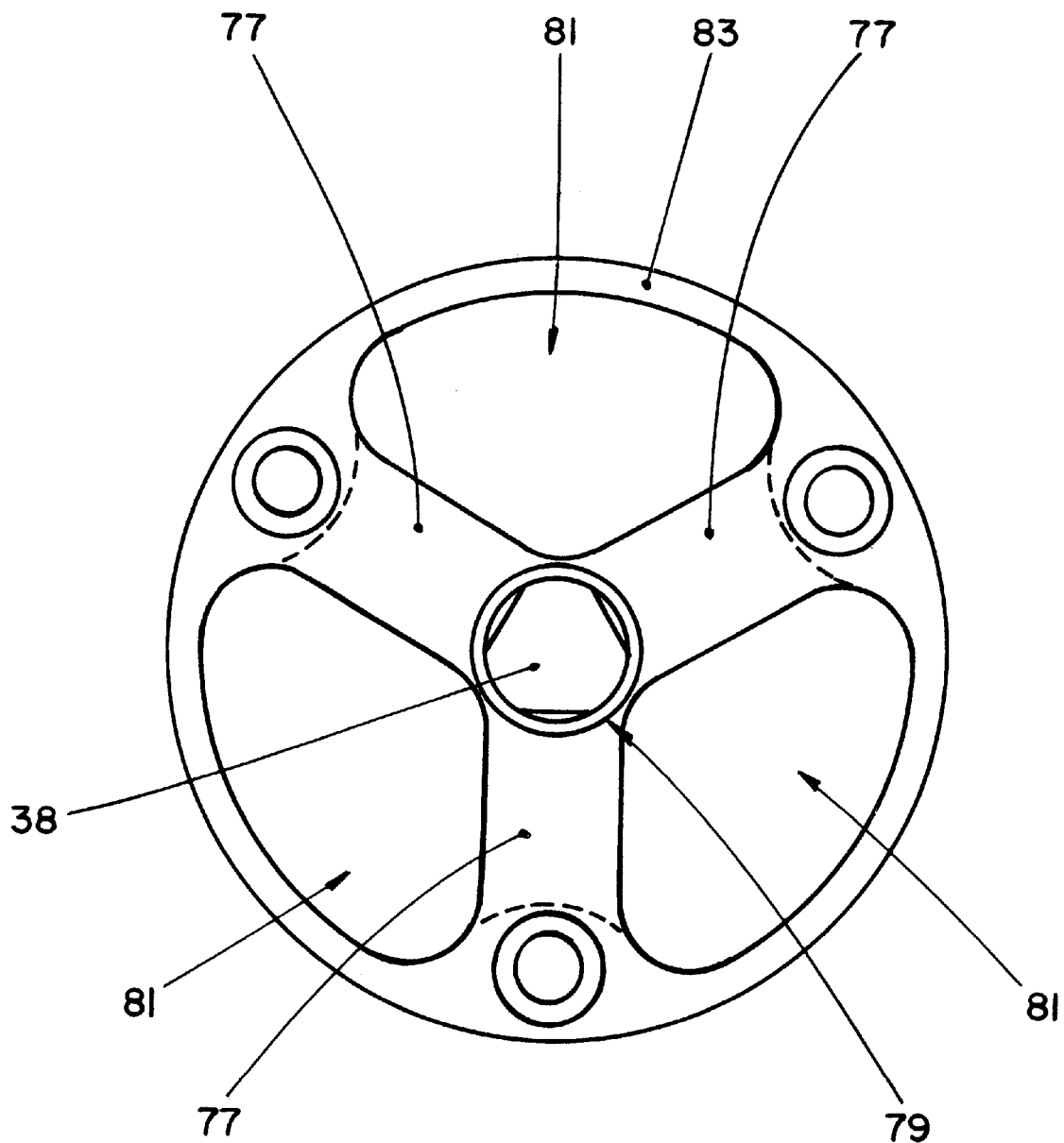
FIG. 18d is an attachment end view of the attachment end of cable preparation tool of FIG. 18b according to the present invention.

The position of the balls 50 and blades 42, 58 can be controlled when manufacturing the tool 22 to accommodate different cable-connector combinations. An example is the case for smaller diameter cables. Some smaller cables require an exposed center conductor 10 that is chamfered or beveled. For this type of preparation a different embodiment of the tool 22 having blades 58 in different positions and two rows of balls 50 are shown in FIGS. 13–17. The tool 22 also includes a center conductor receiving space 62 and a detachable plate 64 in the attachment end 28, so that the rest of the cable components can contact the end cutting blades 58. The detachable plate 64 houses one of the blades 42, center conductor receiving space 62 and the shank 38. The trim end slot 40 in location 'B1' receives a blade 42(B1) responsible for facing off the dielectric 12 material from the inside of the outer conductor 14 to the outside of the center conductor 10. Location 'B1' is a slot in the attachment end 28 of the main body 24. This blade 42(B1) also cuts the outer conductor 14 of the cable to length. The blade design and position prevents signal conductive debris from the outer conductor 14 from embedding in the dielectric 12. The trim end slot 40 shown in location 'C1' receives a blade 42(C1) responsible for beveling the center conductor 10. The slot 40 in location 'C1' and blade 42(C1) are part of the detachable plate 64. The blade 42(C1) is heat treated to increase blade life and maintain sharpness. This blade 42(C1) is positioned to allow the center conductor 10 to feed past the blade 42(C1) as it turns down the center conductor 10 and places a bevel at the desired finish length. The chamfer left on the center conductor 10 is the correct distance from the dielectric 12 and outer conductor 14. The portion of the center conductor 10 that extends beyond this chamfer will have been turned down to a smaller diameter and extends into the center conductor receiving space 62. Once the cable is removed from the tool 22, the turned portion of the center conductor 10 will be separately snipped and discarded by the installer. The need to snip the center conductor 10 is only necessary, if the installer did not properly cut the cable to length (at the center of a valley 20) before applying the tool 22. As shown in FIG. 18a, the tool 22 can include three end trim slots 40 to allow the trimming of the cable 2 shown in FIGS. 1 and 2, where some of the dielectric 12 is exposed between the outer and center conductors 14, 10. In this case, there is a first blade 70 positioned deeper in the attachment end 28 for cutting just the outer conductor 14, there is a second blade 71 for cutting the dielectric 12 which is not as deep as the blade 70, and finally there is a third blade 72 to cut the center conductor 10. Keep in mind that all blades 70–72 are the same as blades 42 and the separate reference numerals are used only for clarity in describing the above three bladed scenario. FIGS. 18b–18d show a combination of the features shown in FIGS. 13–18a to provide a detachable shank end 65 on the attachment end 28 for removing any excess center conductor 10, after the center conductor 10 has been chamfered, so that the excess does not have to be hand snipped by the operator after removal of the cable from the tool 22. The attachment end 28 includes a fourth blade 73 at a proper depth to perform the same function as blade 42(C1) of FIG. 17, while having blade 72 of FIG. 18a to cut off the undesired excess portion of the center conductor 10. The detachable shank end 65 includes the shaft 38 attached to a shaft support structure 75 instead of being directly attached to the attachment end 28. The shaft support 75 includes three support legs 77 which extend outwardly away from an open base 83 to a central location 79. The shaft 38 then extends outward from the central location 79 of the three support legs 77. The openings 81 between the support legs 77 provide clearance for derbies from the cable to escape during removal of various portions of the cable. The detachable shank end 65 therefore provides room for the fourth blade 72 in a position on the attachment end 28 which would normally be occupied by the shank 38.

The balls 50 are of a diameter that will occupy the valley 20 of the corrugated cable to be prepared. Each ball 50 is 'indented' into the main body 24 by a spring 52 and set screw 54. The set screw 54 is tightened so that the spring 52 biases the ball 50 past the plane of the inside diameter 36 enough so that the ball 50 will best settle in and occupy the radius of the valley 20 of a corrugated cable without damaging the outer conductor 14. The spring tension is such that as the tool 22 is driven onto the cable, the balls 50 retract when passing over the crests 18 of the corrugated cable and do not damage the outer conductor 14 at the crests 18. The balls 50 control all dimensions required to prepare the cable for a connector. As described above, each blade 42, 58 of the tool 22 is positioned a certain distance from the centerline of the balls 50 depending on the specifications for the connector. When the balls 50 engage into the valley 18 of the corrugation, the user feels a release because the blades 42 have finished their cuts and the balls 50 have relaxed after having passed the crest 18 where the spring 52 was compressed. When the user feels this release he knows that the cable preparation is complete.

As the cable 74 enters the tool 22 in FIG. 19–20, the first action is that the jacket cutting blade(s) 58 starts removing the rubberized/plastic jacket 16 from the outside diameter of the cable 74, leaving an exposed outer conductor 14. As the tool 22 feeds onto the cable 74, the spring loaded balls 50 make contact with the exposed outer conductor 14, recessing the balls 50 as they pass over the crest 18 of the corrugation. As the tool 22 continues to feed onto the cable 74, the end cutting blades 42 remove the outer conductor 14 and dielectric 12 leaving a thin ring of dielectric on the center conductor 10, if specified for the connector, or facing-off the center conductor 10, if specified for the connector. If an exposed center conductor 10 is required, the tool 22 would include the center conductor receiving space 62 and the additional blades as shown in FIGS. 13–18d, so that the tool 22 would keep feeding over the cable 74 until it chamfers and/or faces off the exposed center conductor 10. When the cable 74 has entered the tool 22 far enough, the spring loaded balls 50 will push themselves into the first available valley 20 of the corrugation. At this time all components of the cable 74 will have been trimmed to the proper specification for the connector and the tool 22 will stop feeding itself.

When the balls 50 are pushed into the valley 20 of the corrugation by the action of the spring 52, the jacket cutting blade 58 will have removed the correct amount of jacket length from the outside diameter of the cable. An end cutting blade 42 will have faced-off the end of the cable ending at the crest 18 of the corrugation on the outer conductor 14. Another end cutting blade 42 will have removed the dielectric 12 leaving exposed dielectric 12 protruding from the outer conductor 14 or flush with the outer conductor 14, depending on the connector requirements. If required, a center conductor beveling blade 42 will have left a chamfer on the center conductor 10 the correct distance from the dielectric 12 and outer conductor 14. Whereby, the center conductor 10 that extends beyond this chamfer will have been turned down to a smaller diameter to be discarded separately by the installer or have been faced off by an additional blade in the attachment end 28.

Figure 21:
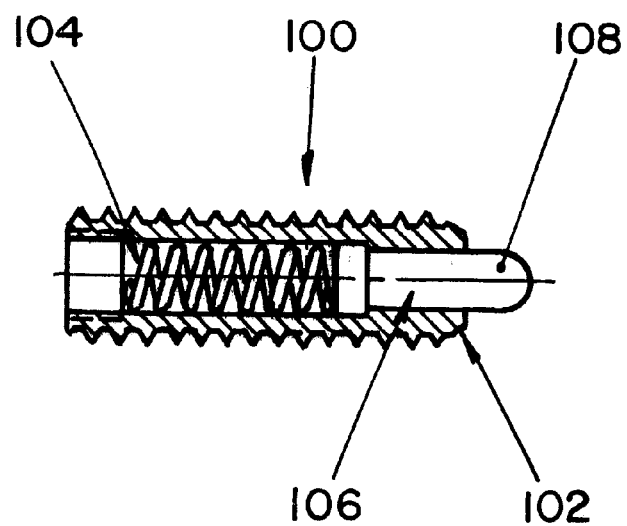
FIG. 21 is a side view showing a valley locator unit of a fourth embodiment of the cable preparation tool according to the present invention.
Figure 22:
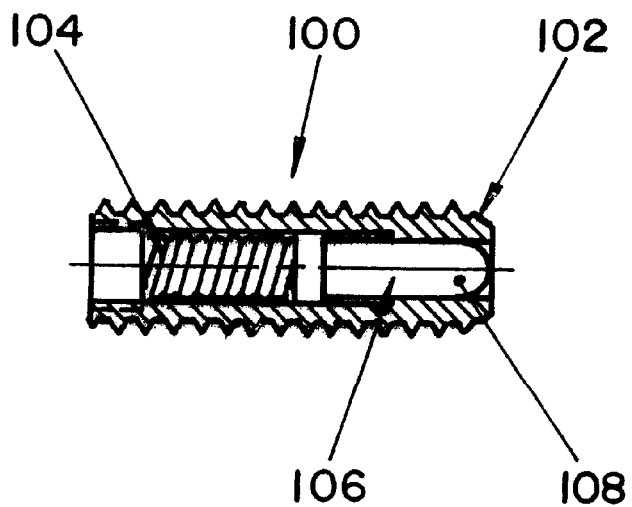
FIG. 22 is another side view showing a valley locator unit of a fourth embodiment of the cable preparation tool according to the present invention.
Figure 25:
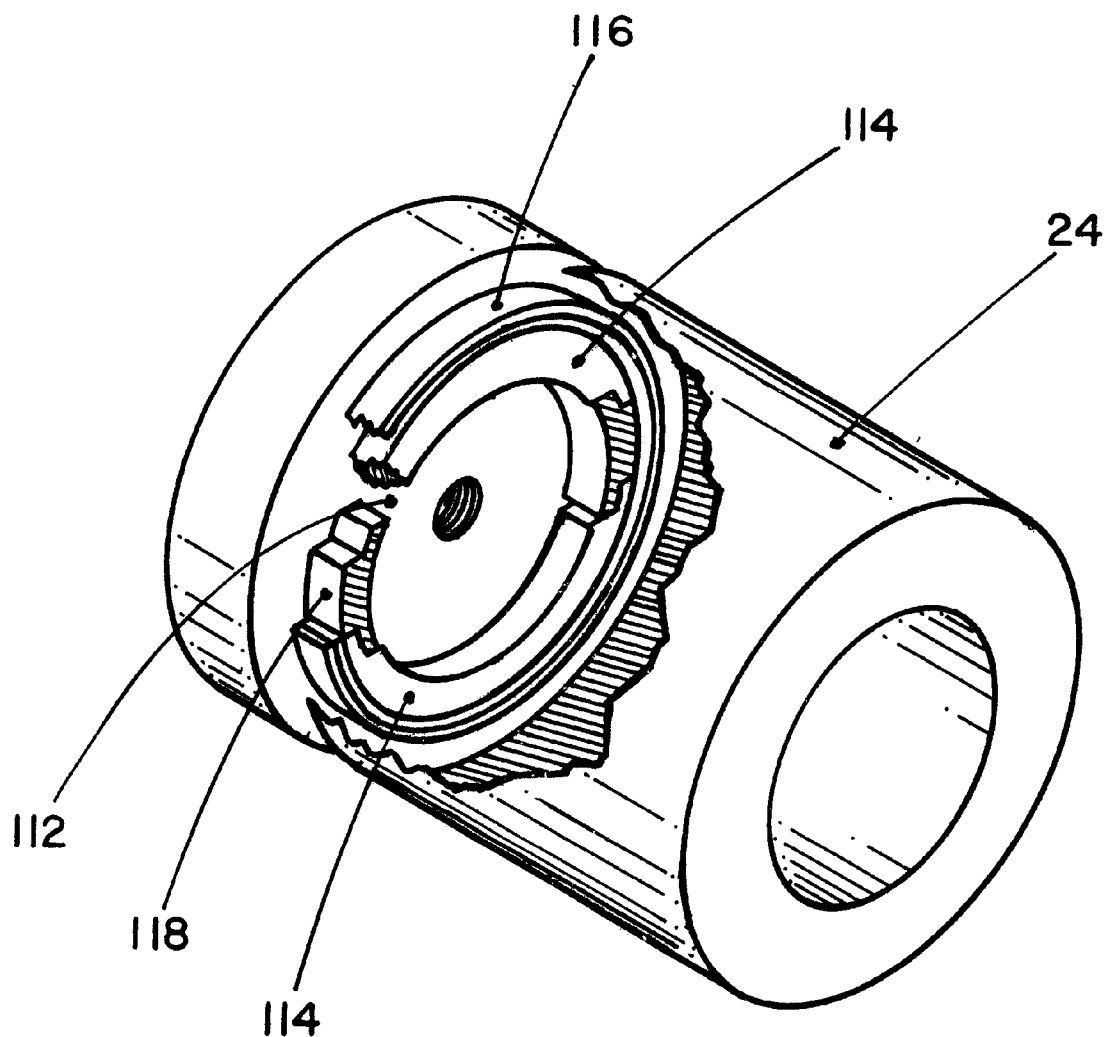
FIG. 25 is a perspective cutaway view of the cable preparation tool of FIG. 23 according to the present invention.
Figure 26:
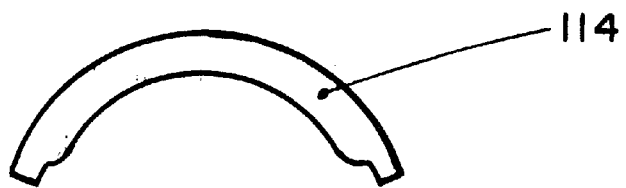
FIG. 26 is a side view of the valley locator unit of the cable preparation tool of FIG. 23 according to the present invention.
Figure 27:
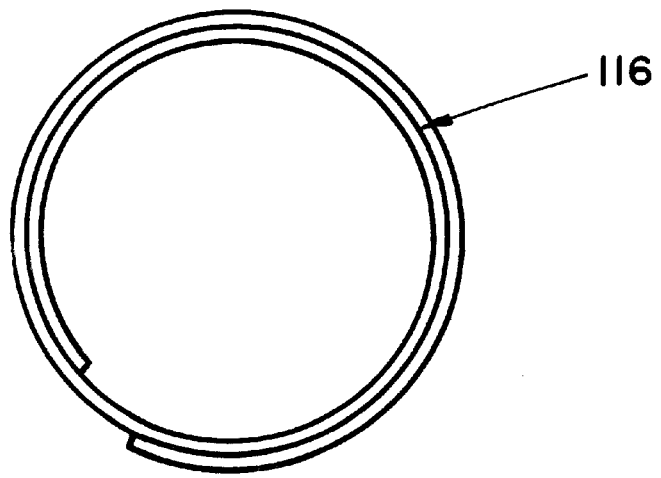
FIG. 27 is an end view of a spring of the cable preparation tool of FIG. 23 according to the present invention.
Figure 28:
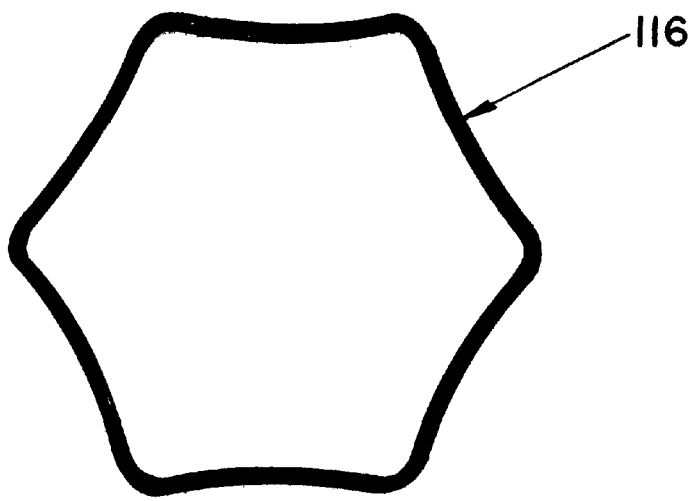
FIG. 28 is an end view of another spring of the cable preparation tool of FIG. 23 according to the present invention.

FIGS. 21–28 show two alternatives to the crest and valley locating system. FIGS. 21–22 show a first alternative of a spring plunger 100 which can replace the ball 50, spring 52 and set screw 54. Essentially, the spring plunger 100 is a set screw 102 with an internal spring 104 and plunger 106. The plunger 106 includes a ball shaped end 108 which acts as the valley locating unit. FIGS. 23–28 show a second alternative. The second alternative includes a spring groove 110, groove openings 112, locating plates 114 and a tension spring 116. The spring groove 110 encircles the main body 24 and replaces the ball holes 48. There are two groove openings 112 at the bottom 118 of the spring groove 110. Each groove opening 112 is approximately one-fourth to one-half of the circumference of the inside diameter of the main body 24 at that location. The locating plates 114 are placed into the groove openings 112 and rest against remaining portion of the bottom 118 of the spring groove 110. The remaining portion of the bottom 118 of the spring groove 110 acts as a support for the locating plates 114. The locating plates 114 are secured in the spring groove 110 by the tension spring 116. FIGS. 23–24 and 27 show a wire wrapped spring, while FIG. 28 shows a band spring. The locating plates 114 rest in the groove openings 112 of the spring groove 110 until a cable is inserted into the main body 24. The crest 18 of the stripped corrugated cable pushes the locating plates 114 outward against the tension of the tension spring 116 as the first crest 18 passes between the locating plates 114. As the cable moves further into the main body 24, the locating plates 114 are pushed into the valley 20 of the corrugated cable by the tension spring 116, thereby locating the valley as described for the crest and valley locating system which uses the balls 50.

While embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of any and all equivalents thereof.

I claim:

1. A cable preparation tool, for stripping components of an end of a coaxial cable having a corrugated conductor including crests and valleys that is shielded by a shielding layer in order to prepare the end of the coaxial cable for attachment of a connector, comprising:

a main body having a cable receiving end to receive the end of the coaxial cable for stripping and preparing the end of the coaxial cable for the connector and having a cable receiving area inside said main body for stripping the shielding layer from the coaxial cable to expose the crests and valleys of the corrugated conductor; and a crest and valley locating system as part of said main body for positioning the exposed crests and valleys in said cable preparation tool so that the proper amount of components of the coaxial cable is removed at the end for attachment of the connector.

2. The cable preparation tool of claim 1, wherein said crest and valley locating system includes at least one valley locator unit extending into said cable receiving area, said valley locator unit movable from a crest of said cable as said crest contacts said valley locator unit; and a spring that biases said valley locator unit into said cable receiving area.

3. The cable preparation tool of claim 2, wherein said crest and valley locating system includes at least one of hole in said main body extending into said cable receiving area; wherein a ball in said hole acts as said at least one valley locator unit, said ball having at least part of a ball surface of said ball extending out said hole and into said cable receiving area; and wherein said spring biases said ball surface into said cable receiving area.

4. The cable preparation tool of claim 3, wherein said hole is threaded to receive a set screw and further including a set screw to bias said spring against said ball.

5. The cable preparation tool of claim 2, wherein said crest and valley locating system includes a series of holes encircling said main body and extending into said cable receiving area; wherein a ball in each of said holes acts as said at least one valley locator unit, said ball having at least part of a ball surface of said ball extending out said hole and into said cable receiving area; and wherein said spring biases each said ball surface into said cable receiving area.

6. The cable preparation tool of claim 5, wherein each of said holes are threaded to receive a set screw and further including a set screw to bias said spring against said ball.

7. The cable preparation tool of claim 5, wherein said series of holes define a row encircling said main body.

8. The cable preparation tool of claim 5, further including a second series of holes encircling said main body.

9. The cable preparation tool of claim 8, wherein said second series of holes define a second row encircling said main body.

10. The cable preparation tool of claim 2, said crest and valley locating system includes at least one of hole in said main body extending into said cable receiving area; wherein a spring plunger in said hole includes a plunger acting as said at least one valley locator unit; and wherein at least part of said plunger extends out said hole and into said cable receiving area.

11. The cable preparation tool of claim 10, wherein said hole is threaded to receive said spring plunger.

12. The cable preparation tool of claim 2, wherein said crest and valley locating system includes a series of holes encircling said main body and extending into said cable receiving area; wherein a spring plunger in each of said holes includes a plunger acting as said at least one valley locator unit; and wherein at least part of said plunger extends out said hole and into said cable receiving area.

13. The cable preparation tool of claim 12, wherein each of said holes are threaded to receive said spring plunger.

14. The cable preparation tool of claim 12, wherein said series of holes define a row encircling said main body.

15. The cable preparation tool of claim 12, further including a second series of holes encircling said main body.

16. The cable preparation tool of claim 15, wherein said second series of holes define a second row encircling said main body.

* * * * *